United States Patent Office 3,399,035
Patented Aug. 27, 1968

3,399,035
PROCESS FOR THE RECOVERY OF BORIC ACID FROM THE OXIDATION MIXTURES OF LIQUID-PHASE OXIDATION OF HYDROCARBONS
Franz Broich and Horst Grasemann, Marl, Germany, assignors to Chemische Werke Hüls Aktiengesellschaft, Marl, Germany
No Drawing. Filed Jan. 26, 1965, Ser. No. 428,251
Claims priority, application Germany, Feb. 12, 1964, C 32,111
21 Claims. (Cl. 23—149)

ABSTRACT OF THE DISCLOSURE

In a process for the production of higher alcohols, such as cyclododecanol, by the oxidation of hydrocarbons in the presence of a boron compound, such as boric acid, the improvement of recovering the boron compound in sufficient purity for recycling to the oxidation step, by conducting an ester interchange reaction with a monovalent aliphatic alcohol of 1–4 carbon atoms, such as methyl alcohol, to form a borate, such as methyl borate, simultaneously distilling the resultant borate from the reaction mixture, and then saponifying the resultant distilled ester to form boric acid.

---

The present invention relates to the recovery of boric acid produced by the liquid phase oxidation of hydrocarbons. More particularly, it relates to the recovery of boric acid produced by the liquid phase oxidation of hydrocarbons in the presence of boron compounds by heating the said liquid phase oxidation products of hydrocarbons with from 1 to 10 times the weight thereof of a monovalent aliphatic alcohol and recovering boric acid from said mixture in the form of the boric acid ester of said univalent aliphatic alcohol.

The liquid phase oxidation of aliphatic and cycloaliphatic hydrocarbons with oxygen or oxygen-containing compounds in the presence of boron compounds, such as boric anhydride, meta-, or orthoboric acid, or the tri-tertiary butyl ester of boric acid is a well-known reaction. During such reaction the oxidation is regulated so that the reaction products usually consist primarily of the corresponding alcohols. For example, the oxidation of cyclododecane gives a reaction product consisting of about 80% by weight of cyclododecanol and 10% by weight of cyclododecanone, based on the weight of the cyclododecane reacted. The reaction mixture also contains in addition to the above products the boron compounds used as the catalyst for the reaction. The boron compounds usually are at least partially converted into esters of the alcohols produced during the reaction, that is, cyclododecanol borates, in the case of the oxidation of cyclododecane.

In order to recover boric acid from reaction mixtures of the type described above it has been the custom to treat the oxidation mixtures with water at 90° C. in order to saponify the boric acid esters present in the mixture, and then to remove the resulting alcohols by distillation. After removal of the alcohols, the resulting mixture contains the boric acid together with other soluble products such as formic acid, acetic acid, or polycarboxylic acids in aqueous solution, and from which some of the boric acid will crystallize upon cooling. The polycarboxylic acids present in the mixture tend to crystallize upon the precipitated boric acid and these polycarboxylic acids can be separated from the boric acid only with considerable difficulty and expense. It has been found also that the boric acid thus recovered is not sufficiently pure, even after careful purification, to be suitable for reuse in the oxidation process.

According to the present invention a method has now been found whereby boric acid of sufficient purity for reuse in oxidation processes can be obtained. Such a grade of boric acid is obtained by heating the oxidation mixture with from 1 to 10 times its weight of a monovalent aliphatic alcohol containing from 1 to 4 carbon atoms and then after separation of the unreacted alcohol, reacting the resulting alcohol-boric acid ester with an amount of water necessary to saponify the boric acid esters, and finally separating the precipitated boric acid.

The operation of the process of the present invention can be illustrated by applying it to the recovery of boric acid produced in the liquid phase oxidation of cyclododecane with oxygen or an oxygen containing gas at temperatures ranging from 140 to 180° C., and preferably between 155 and 165° C., in the presence of 3 to 6% by weight (based on the weight of the cyclododecane) of boron compounds such as boric anhydride, metaboric or orthoboric acid, or the tri-tertiary-butyl ester of boric acid, and preferably boric anhydride or tri-tertiary butyl ester of boric acid. It is understood, however, that other boron compounds may also be employed and that the process may be similarly applied to other hydrocarbons such as butane, and higher aliphatic hydrocarbons, such as octane, decane, dodecane, etc. and to other cycloaliphatic hydrocarbons such as cyclopropane, and higher cycloaliphatic hydrocarbons, such as cyclononane, cycloundecane, etc. It is understood also that variations in the oxidation temperatures may be employed, depending upon the particular compound being oxidized, and also that the usual variations in the operating procedure which are conventional or obvious to one skilled in the art can be employed.

The reaction mixture resulting from the oxidation of cyclododecane as above described usually contains up to about 18 to 25% by weight of cyclododecanol, principally in the form of cyclododecanol-boric acid ester, together with from 3 to 6% by weight of cyclododecanone and other oxidation products of predominantly acid character, such as for example, from 0.3 to 1% by weight of formic acid, from 0.4 to 1.2% by weight of acetic acid and from 1 to 2% by weight of polycarboxylic acids, and other intermediate oxidation products such as alcohols, e.g. cyclododecandiol or -dione.

The oxidation mixture is preferably transferred to an esterification apparatus, where the esterification is preferably carried out by feeding the oxidation mixture into the upper portion of the rectification column in countercurrent to alcohol vapors fed into the lower end of the column. From the head of the column a mixture of boric acid esters and alcohol is removed by distillation and separated in a dephlegmator from the excess of of alcohol distilled off, leaving an azeotropic mixture of boric acid ester and alcohol, the separated alcohol being returned to the column for further esterification.

For esterification of the boric acid or for reesterification of the boric acid esters, monovalent aliphatic alcohols containing from 1 to 4 carbon atoms, which form azeotropes with water, as for example, methanol, ethanol and propanol, and especially methanol or tertiary butyl alcohol, can be employed. When the latter is used, the resulting boric acid ester can be introduced during the oxidation.

The esterification or reesterification with the monovalent aliphatic alcohol can be performed at temperatures ranging from 80 to 160° C., and preferably ranging from 120 to 140° C. The alcohols are used in at least stoichiometric amounts and can be used in excess of 3- to 5-fold relative to the orthoboric acid equivalent of the boron compounds present. Under such conditions the other acid components such as formic acid, acetic acid and polycarboxylic acids will not be appreciably esterified, since the boric acid esters are formed much more rapidly and after their formation are readily volatilized and removed from the reaction zone. The boric acid ester-alcohol azeotrope is treated with sufficient water to effect saponification, a slight excess of water generally being sufficient. The precipitated boric acid can be returned to the oxidation stage without further purification.

Especially satisfactory results are obtained if the oxidation mixture is treated with 0.1 to 1% by weight, and preferably 0.2 to 0.5% by weight of an alkaline substance such as for example, caustic soda or aluminum hydroxide, before being sent to the esterification column.

By the above procedure it is possible to effect almost complete recovery of boric acid in a high degree of purity from the reaction mixture resulting from the liquid phase oxidation of hydrocarbons in the presence of boron compounds.

The examples given below are for the purpose of illustrating more specifically the present invention. It is understood, however, that the procedures set forth therein can be readily varied by one skilled in the art. Such variations which do not depart from the concept of the invention disclosed herein are intended to come within the scope of the appended claims.

EXAMPLE I 1700 grams of a mixture resulting from the liquid phase oxidation of cyclododecane in the presence of catalysts comprising boron compounds, containing 1200 g. of cyclododecane, 60 g. of cyclododecanone, 70 g. of intermediate oxidation products and 70 g. of cyclododecanolboric acid-esters (equivalent to 59.6 g. orthoboric acid) were reacted with 2 g. of aluminum hydroxide, heated to 120° C. and introduced over a period of 6 hours into a column filled with raschig rings. From the sump of the column methanol was distilled in countercurrent relation to the descending current of the distillation residue, 250 mls. of methanol being thus introduced. The resulting methyl borate-methanol azeotrope, together with the excess of methanol was passed to a dephlegmator where the excess methanol was removed and returned to the sump of the column. The residue from the distillation after the completion of operation contained 1.6 g. of boric acid. The remaining methanol-methyl borate mixture was saponified in the conventional manner with 40 g. of water and produced 57 g. of pure orthoboric acid which was recovered by conventional means.

EXAMPLE II 255 grams of a mixture resulting from the liquid phase oxidation of cyclododecane, in the presence of catalysts comprising boron compounds, and containing 180 g. of cyclododecane, 10 g. of cyclododecanone, 16 g. of intermediate oxidation products and 49 g. of cyclododecanolboric acid esters (equivalent to 15 g. of combined boric acid), were mixed with 1 g. of caustic soda, heated to 90° C. and over a period of 80 minutes treated as described in Example I, 240 mls. of methanol being employed. At the end of the operation no boric acid could be detected in the remaining oxidation residue. By reaction of the residue with 9 g. of water saponification was effected and 14.6 g. of chemically pure orthoboric acid obtained.

EXAMPLIE III 2000 grams of a mixture resulting from the liquid phase oxidation of n-decane in the presence of catalysts comprising boron compounds, and containing 60 g. of n-decanone, 40 g. of intermediate oxidation products, 300 g. of n-decanol ester of boric acid (equivalent to 110 g. of chemically combined boric acid) and 25 g. of freely suspended boric acid were added dropwise to the column as described in Example I, a total of 400 mls. of methanol being used. The reaction was concluded after 4 hours. In the oxidation mixture 2 g. of boric acid were found, while 110 g. were obtained from the distillate.

What is claimed is:
1. In a process comprising the oxidation of a hydrocarbon in the presence of a boron compound to form a reaction mixture comprising a borate ester of an alcohol formed from said hydrocarbon, the improvement of recovering from said reaction mixture a boron compound in sufficient purity for use in said oxidation step, said improvement comprising:
  (A) heating said reaction mixture to 80–160° C. with a monovalent aliphatic alcohol of 1–4 carbon atoms to conduct an ester interchange reaction with said borate ester to form a volatile borate ester of said monovalent aliphatic alcohol of 1–4 carbon atoms, the amount of said monovalent alcohol being at least stoichiometric relative to the orthoboric acid equivalent of the boron compounds present;
  (B) distilling said volatile borate ester from said reaction mixture; and
  (C) saponifying said volatile borate ester to precipitate boric acid of sufficient purity for said oxidation step.
2. A process as defined by claim 1 wherein said hydrocarbon is a higher hydrocarbon.
3. A process as defined by claim 1 wherein steps (A) and (B) are conducted substantially simultaneously.
4. The process of claim 1 wherein the reaction mixture is heated with from 1 to 10 times its weight of said monovalent aliphatic alcohol containing from 1 to 4 carbon atoms.
5. The process of claim 1 wherein the ester interchange reaction is effected at temperatures ranging from 120–140° C.
6. The process of claim 1, wherein the monovalent aliphatic alcohol is slowly added to the reaction mixture.
7. The process of claim 1 wherein the monovalent aliphatic alcohol is methanol.
8. The process of claim 1 wherein the monovalent aliphatic alcohol is tertiary butyl alcohol.
9. A process as defined by claim 1 wherein preceding step (A) the reaction mixture is treated with 0.1–1% by weight of an alkaline substance selected from the group consisting of caustic soda and aluminum hydroxide.
10. The process of claim 1 wherein step (A) is conducted by introducing the reaction mixture slowly into an upper plate of a distillation column, and distilling from the sump of said column vapors of said monovalent aliphatic alcohol containing from 1 to 4 carbon atoms, said vapors coming into contact in said column with the said descending reaction mixture.
11. A process as defined by claim 10 wherein preceding step (A) the reaction mixture is treated with 0.1–1% by weight of an alkaline substance selected from the group consisting of caustic soda and aluminum hydroxide.
12. A process as defined by claim 1 wherein said hydrocarbon is selected from the group consisting of cyclododecane and n-decane.
13. A process as defined by claim 7 wherein said hydrocarbon is selected from the group consisting of cyclododecane and n-decane.
14. A process as defined by claim 10 wherein said hydrocarbon is selected from the group consisting of cyclododecane and n-decane.
15. A process as defined by claim 11 wherein said hydrocarbon is selected from the group consisting of cyclododecane and n-decane.

16. A process as defined by claim 3 wherein said hydrocarbon is selected from the group consisting of cyclododecane and n-decane.

17. A process as defined by claim 15 wherein said monovalent aliphatic alcohol is methanol.

18. A process as defined by claim 16 wherein said monovalent aliphatic alcohol is methanol.

19. A process as defined by claim 5 wherein steps (A) and (B) are conducted substantially simultaneously.

20. A process as defined by claim 5 wherein said hydrocarbon is selected from the group consisting of cyclododecane and n-decane.

21. A process as defined by claim 19 wherein said hydrocarbon is selected from the group consisting of cyclododecane and n-decane.

References Cited

UNITED STATES PATENTS

| | | | |
|---|---|---|---|
| 2,833,623 | 5/1958 | May et al. | 23—149 |
| 3,011,871 | 12/1961 | May et al. | 23—149 |
| 3,232,704 | 2/1966 | Helbig et al. | 23—149 |
| 3,240,820 | 3/1966 | Olenberg et al. | 23—149 X |

OSCAR R. VERTIZ, *Primary Examiner.*

HERBERT T. CARTER, *Assistant Examiner.*